United States Patent
Tsuda et al.

(10) Patent No.: US 7,819,468 B2
(45) Date of Patent: Oct. 26, 2010

(54) SEAT FOR VEHICLE (75) Inventors: Toshihiko Tsuda, Shioya-gun (JP); Kanae Tsukidate, Shioya-gun (JP); Toshikazu Hirose, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/283,023

(22) Filed: Sep. 9, 2008

(65) Prior Publication Data

US 2009/0072595 A1    Mar. 19, 2009

(30) Foreign Application Priority Data

Sep. 13, 2007 (JP) ............................. 2007-237878

(51) Int. Cl.
*B60N 2/44* (2006.01)
(52) U.S. Cl. ................. 297/188.1; 297/15; 297/188.13; 297/331
(58) Field of Classification Search .................. 297/15, 297/188.13, 188.01, 188.08, 188.09, 188.1, 297/313, 331, 335, 337; 296/37.15
See application file for complete search history.

(56) References Cited

U.S. PATENT DOCUMENTS

| | | | | |
|---|---|---|---|---|
| 2,748,841 A | * | 6/1956 | Rimkus | ................. 297/188.12 |
| 6,082,816 A | * | 7/2000 | Gottlieb et al. | ........... 297/188.1 |
| 6,102,463 A | * | 8/2000 | Swanson et al. | .......... 296/37.15 |
| 6,161,896 A | * | 12/2000 | Johnson et al. | ........... 297/188.1 |
| 6,390,547 B1 | * | 5/2002 | Spykerman | ............... 297/188.1 |
| 6,817,660 B2 | * | 11/2004 | Ito et al. | ......................... 297/15 |
| 6,827,388 B2 | * | 12/2004 | Kayumi et al. | ................. 296/64 |
| 6,981,730 B2 | * | 1/2006 | Bixby | ...................... 296/37.15 |
| 7,040,702 B2 | * | 5/2006 | Yamada et al. | ............... 297/331 |
| 2008/0164740 A1 | * | 7/2008 | Harper et al. | ................ 297/331 |

FOREIGN PATENT DOCUMENTS

| | | | |
|---|---|---|---|
| JP | 59206240 A | * | 11/1984 |
| JP | S63-46252 | | 3/1988 |
| JP | 06-65075 | | 9/1994 |
| JP | 10-033307 | | 2/1998 |
| JP | 2001-341562 | | 12/2001 |
| JP | 2006-103494 | | 4/2006 |
| JP | 2006-188210 | | 7/2006 |

* cited by examiner

*Primary Examiner*—Joseph F Edell
(74) *Attorney, Agent, or Firm*—Carrier, Blackman & Associates P.C.; William D. Blackman; Joseph P. Carrier (57) ABSTRACT

This seat for a vehicle is provided a seat cushion which is rotatable toward a seat back in an upright condition around an axis provided on the seat back side, the seat for a vehicle comprising: a storage recessed portion which is provided in a bottom face of the seat cushion; and a lid which opens and closes the storage recessed portion, the lid being rotatably attached with a rear end portion of the storage recessed portion as a supporting axis.

17 Claims, 6 Drawing Sheets

SEAT FOR VEHICLE

Priority is claimed on Japanese Patent Application No. 2007-237878, filed Sep. 13, 2007, the contents of which are incorporated herein by reference.

BACKGROUND OF THE INVENTION

1. Field of the Invention

The present invention relates to a seat for a vehicle.

2. Description of the Related Art

There is a seat for a vehicle in which a seat cushion can be superimposed on a seat back by rotating to a vehicle body rear side. Moreover, a box for holding small articles is provided below this movable seat cushion (see, for example, Japanese Unexamined Utility Model Application, First Publication No. H06-65075).

In a seat for a vehicle disclosed in Japanese Unexamined Utility Model Application, First Publication No. H06-65075, when a passenger arranges the seat cushion such that he can sit on it, the box is hidden under the seat cushion, ensuring a good appearance.

However, when the seat cushion is rotated to the rear, the box moves to the rear together with the seat cushion while an opening therein is kept facing upwards. At an end point, the box is held along a bottom part of the seat cushion which is in an upright condition. This leads to a problem of poor appearance, since the box is exposed. There is also a problem that space above the vehicle floor is reduced by the exposure of the box.

Accordingly, it is an object of the invention to provide a seat for a vehicle including a storage portion that has good appearance and can effectively use the space above the vehicle floor.

SUMMARY OF THE INVENTION

The present invention employs the followings in order to achieve the above described object.

Namely, a seat for a vehicle of the present invention is provided with: a seat for a vehicle in which a seat cushion is rotatable toward a seat back in an upright condition around an axis provided on the seat back side, the seat for a vehicle comprising: a storage recessed portion which is provided in a bottom face of the seat cushion; and a lid which opens and closes the storage recessed portion, the lid being rotatably attached with a rear end portion of the storage recessed portion as a supporting axis.

According to the above described seat for a vehicle, when the storage recessed portion is sealed with the lid, the storage recessed portion and the lid do not protrude from the bottom face of the seat cushion. Therefore, when the storage recessed portion is sealed with the lid, the storage recessed portion is not exposed, not only when the seat cushion is arranged in a condition where a passenger can sit but also when the seat cushion is rearwardly rotated and superimposed on the upright seat back, thereby obtaining a good appearance. Also, when the storage recessed portion is sealed with the lid and the seat cushion is superimposed on the upright seat back, the storage recessed portion and the lid do not protrude from the bottom face of the seat cushion. As a result, a space of the vehicle body floor is widely kept.

Moreover, even when the storage recessed portion is provided, the height of the seat cushion from the vehicle body floor can be suppressed.

It is also possible for the depth of the storage recessed portion to be made shallower toward the rear of the seat cushion.

In this case, by making the storage recessed portion shallower toward the rear of the seat cushion, the cushion thickness of the seat cushion at the hip-point can be increased. This can prevent loss of seating comfort for the passenger who sits in the seat for a vehicle, which is caused by disposing the storage recessed portion in the seat cushion.

It is also possible for the approximately U-shaped stand leg portion that spans across the lid in a vehicle-width direction to be provided on the bottom face of the seat cushion, and to support the seat cushion on a vehicle body floor.

In this case, it is possible to prevent the lid from interfering with the stand leg portion when opening and closing the lid.

It is also possible for the stand leg portion to be rotatably provided on the bottom face of the seat cushion.

In this case, to facilitate the operation of opening and closing the lid, the stand leg portion can be rotated and retracted. When the storage recessed portion is sealed with the lid and the seat cushion is superimposed on the upright seat back, the stand leg portion is rotated and folded. The size of the protrusion from the bottom face of the seat cushion becomes shorter, thereby, a space of the upper of the vehicle body floor is widely kept.

It is also possible for the seat cushion to be disposed such that it can be pressed down to the vehicle body floor at front leg level; a control member which opens and closes the lid is provided on the bottom face of the seat cushion; and when the control member holds the lid in a closed condition and the seat cushion is pressed down to the vehicle body floor at front leg level, the control member contacts to the vehicle body floor.

In this case, when the seat cushion is pressed down to the vehicle body floor at front leg level, the mounting of the seat cushion with respect to the vehicle body floor is enhanced.

DETAILED DESCRIPTION OF THE INVENTION

An embodiment of a seat for a vehicle according to the invention will now be described with reference to FIGS. 1 to 6B. In the following explanations, an up-down direction is the up-down direction of the vehicle body, a front-rear direction is the front-rear direction of the vehicle body, and a left-right direction is one that runs along the width of the vehicle from the driver's seat.

Figure 1:
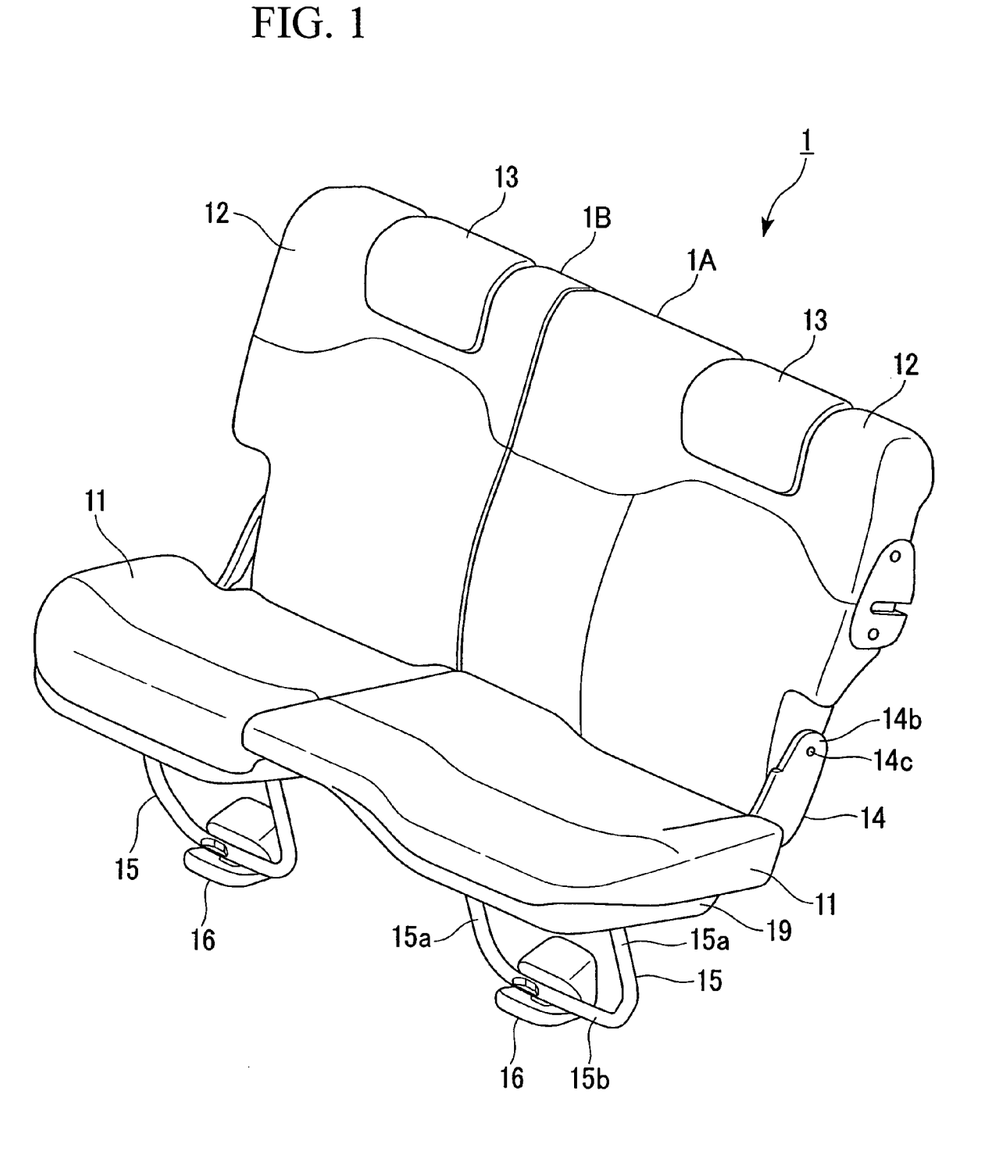
FIG. 1 is an exterior perspective view of a rear seat according to an embodiment of the present invention.

FIG. 1 is an exterior perspective view of a rear seat 1 as a seat for a vehicle. The rear seat 1 is divided at a predetermined ratio (for example, 7:3 or 6:4) in the left-right direction, and includes a wide left-side rear seat 1A and a narrow right-side rear seat 1B.

A configuration common to the rear seats 1A and 1B will be explained. The rear seats 1A and 1B each include a seat cushion 11 that supports the buttocks of a passenger, a seat back 12 that supports the back of the passenger, and a head rest 13 that supports the head of the passenger.

Figure 2:
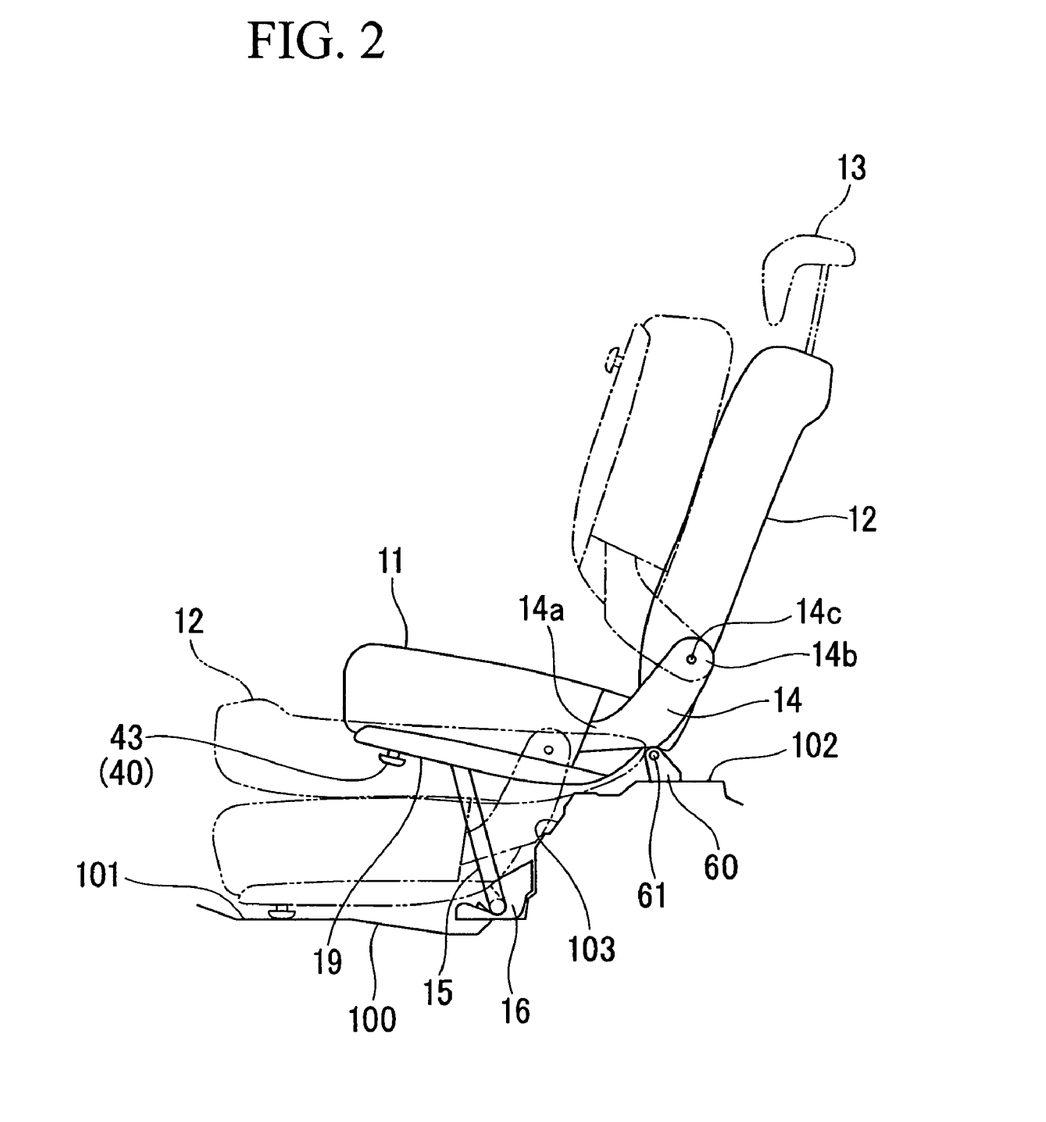
FIG. 2 is an explanatory side view of a seat arrangement of the rear seat.

As shown in FIG. 2, the rear seats 1A and 1B are arranged on a vehicle body floor 100 near a stepped floor 103 including a front-side lower floor 101 which connects to a rear-side higher floor 102 that is higher than the lower floor 101. Here, the lower floor 101 is the vehicle body floor for the front legs of the rear seats 1A and 1B.

A bottom end of the seat back 12 is movably attached via an axis 61 to a base 60 installed near a front end of the higher floor 102. As shown by the solid line in FIG. 2, an unillustrated supporting mechanism can hold the seat back 12 in a condition of being upright while inclining slightly to the rear. Moreover, as shown by the long dashed double short dashed line in FIG. 2, the seat back 12 can be forwardly reclined by forwardly rotating it around the spindle 61.

The seat cushion 11 is movably attached to the seat back 12 via a rotation arm 14. More specifically, one end side 14*a* of the approximately L-shaped rotation arm 14 is secured to the seat cushion 11, and another end side 14*b* is movably attached around an axis 14*c* provided below the seat back 12.

As shown in FIG. 1, a stand leg portion 15 is provided on a bottom face of each seat cushion 11, and supports the seat cushion 11 on the vehicle body floor 100. The stand leg portion 15 is approximately U-shaped, bottom ends of left and right vertical shafts 15*a* being linked by a horizontal shaft 15*b*, and tops of these vertical shafts 15*a* are movably supported by the frame of the seat cushion 11. As shown in FIG. 2, the stand leg portion 15 is upright with respect to the seat cushion 11. The stand leg portion 15 can therefore supports the seat cushion 11 on the vehicle body floor 100, and hold it in the condition shown by the solid line in FIG. 2. This condition is hereinafter termed 'condition of possible for sitting'. A leg-receiving member 16 is arranged at a connection part of the lower floor 101 and the stepped floor 103, and receives the horizontal shaft 15*b* of the stand leg portion 15 when the seat cushion 11 is shifted to the condition of possible for sitting.

Figure 4:
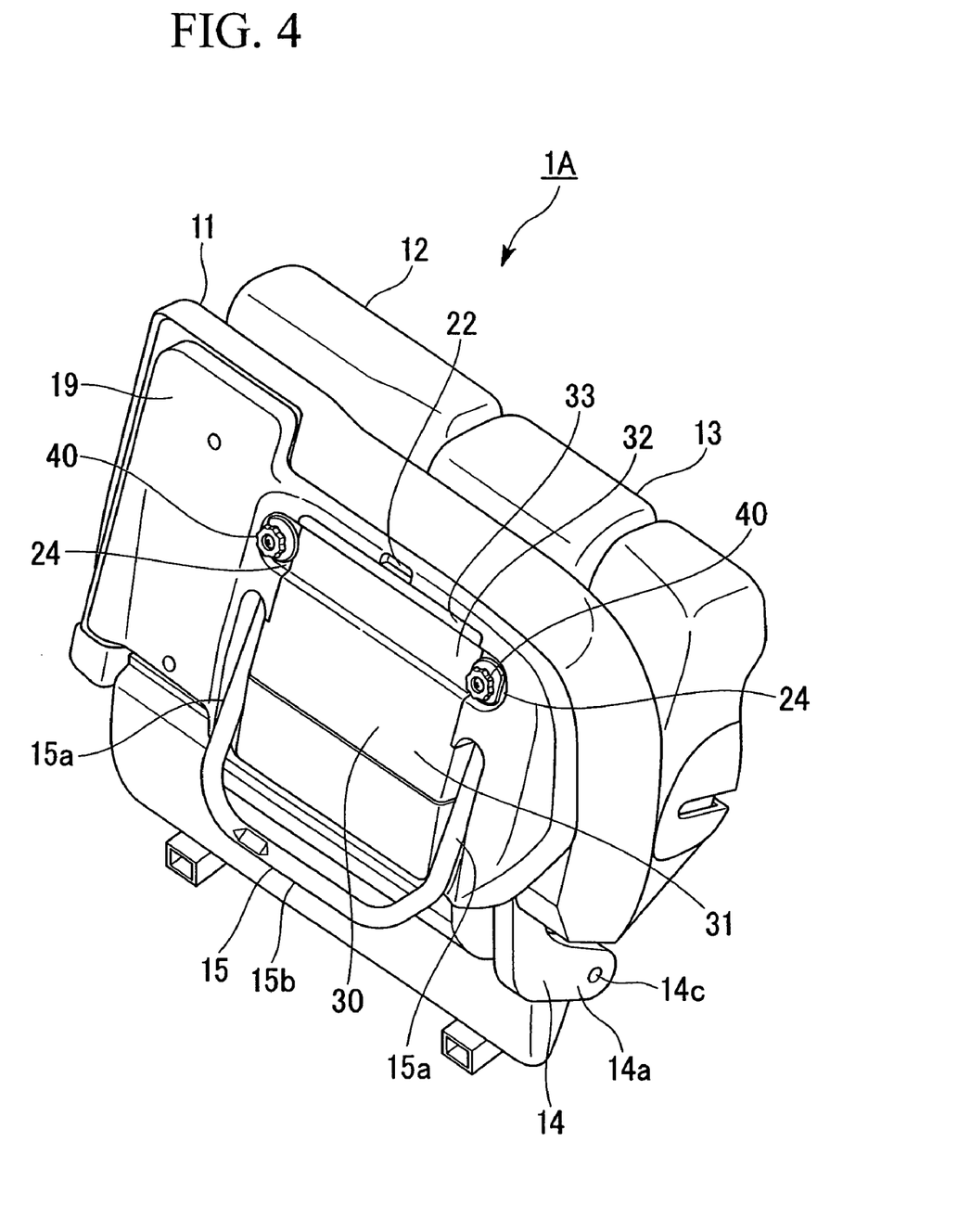
FIG. 4 is an exterior perspective view of a rear seat with a closed lid when the seat cushion is in a tip-up condition.

When the seat cushion 11 is rearwardly rotated from the condition of possible for sitting, as shown by the alternate long and short dashed line in FIG. 2, the seat cushion 11 can be superimposed on the upright seat back 12. This condition is hereinafter termed 'tip-up condition'. When the seat cushion 11 is in the tip-up condition, the space on the lower floor 101 is increased by an amount equivalent to retracting the seat cushion 11 rearwardly upwards. This enables a tall piece of luggage to be mounted in this space. As shown in FIG. 4, when the seat cushion 11 is in the tip-up condition, the space on the lower floor 101 can be further increased by downwardly rotating and retracting the stand leg portion 15. Moreover, an unillustrated mechanism maintains the tip-up condition by downwardly rotating the stand leg portion 15 and storing it in below the seat cushion 11.

In the tip-up condition, the seat backs 12 of the rear seats 1A and 1B forwardly rotate around the spindle 61. Therefore, as shown by the long dashed double short dashed line in FIG. 2, the seat cushion 11 and the seat back 12 can be pressed toward the lower floor 101 while they are superimposed. This condition is hereinafter termed 'dive-down condition'.

If the seat back 12 is forwardly rotated around the spindle 61 even when the seat cushion 11 and the seat back 12 are in the condition of possible for sitting, the forward rotation of the seat back 12 makes the seat cushion 11 shift forward while relatively rotating around the spindle 14*c*. The stand leg portion 15 of the seat cushion 11 is consequently folded as it forwardly rotates around the horizontal shaft 15*b* supported by the leg-receiving member 16. As a result, the seat cushion 11 is pressed down to the lower floor 101, and the seat back 12 is superimposed over it, attaining the dive-down condition.

That is, the rear seats 1A and 1B constitute seats for a vehicle that can be arranged in three conditions, namely the condition of possible for sitting which allows a passenger to sit, the tip-up condition where the seat cushion 11 is superimposed on the upright seat back 12, and the dive-down condition where the seat cushion 11 and the seat back 12 are superimposed and pressed down to the vehicle floor at front leg level (lower floor 101).

The head rests 13 are respectively arranged slightly to the left of center in the left-right direction in the rear seat 1A and approximately in the center of the left-right direction of the rear seat 1B, and can move up and down to the seat backs 12.

While the rear seats 1A and 1B have this common configuration, in this embodiment, only the seat cushion 11 of the rear seat 1A includes a storage portion. This storage portion will be explained in detail.

Figure 3:
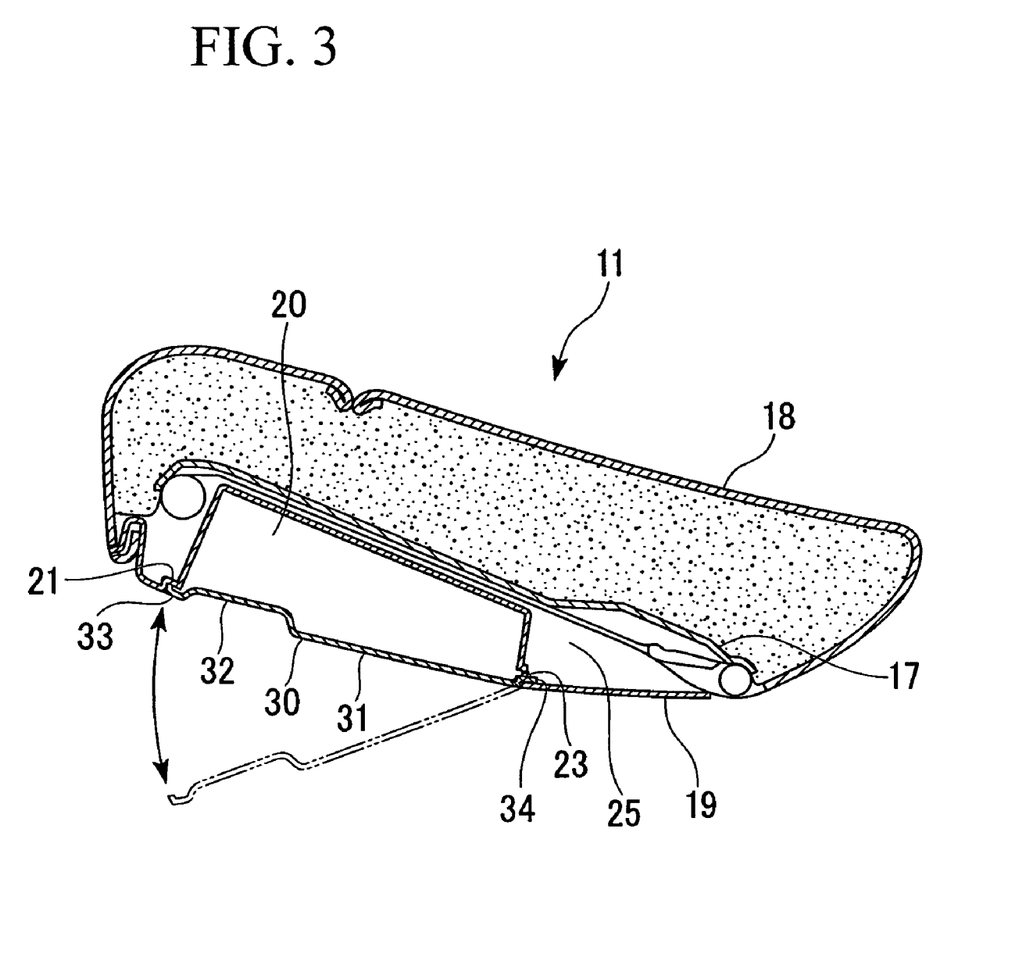
FIG. 3 is a cross-sectional view of a seat cushion of the rear seat.

As shown in FIG. 3, the seat cushion 11 includes a seat cushion pad 18 that is secured to a top side of a seat frame 17, and an under-cover part (bottom side of seat cushion 11) 19 that is secured to the bottom side of the seat frame 17. While this configuration is common to both rear seats 1A and 1B, a storage recessed portion 20 receding to the seat cushion pad 18 side is provided in the under-cover part 19. The seat cushion 11 includes a lid 30 for opening and closing the storage recessed portion 20, and a control member 40 (see FIGS. 4 to 6B) that can open and close the lid 30.

Figure 5:
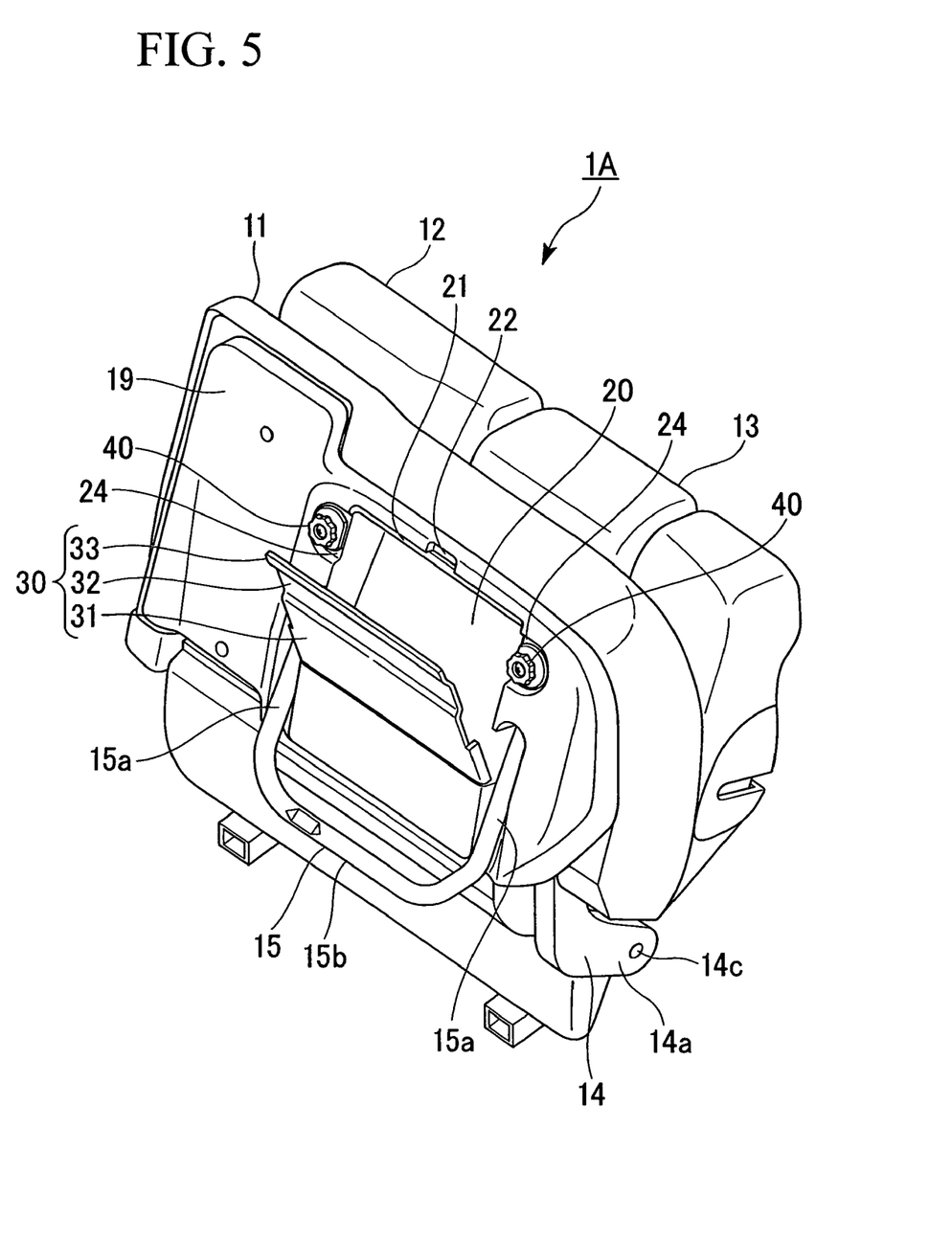
FIG. 5 is an exterior perspective view of a rear seat with an open lid when the seat cushion is in a tip-up condition.

As shown in FIG. 5, the storage recessed portion 20 is arranged between the left and right vertical shafts 15*a* and 15*a* of the stand leg portion 15, and is rectangular in plan view. As shown in FIG. 3, the depth of the storage recessed portion 20 becomes gradually shallower toward the rear. A retaining step 21 is formed at the front of the storage recessed portion 20 along the entire left-right direction. A small recessed portion 22 for lid control is provided in front of the retaining step 21, in the center of the left-right direction of the storage recessed portion 20. As shown in FIG. 3, in the under-cover part 19, a plurality of (for example three) lid attachment holes 23 for rotatably supporting the lid 30 are provided in a rear end of the storage recessed portion 20.

As shown in FIG. 3, in the under-cover part 19, the rear of the storage recessed portion 20 is a hollow portion 25, where there is no seat cushion pad 18. If it were attempted to downwardly expand the seat cushion pad 18 behind the storage recessed portion 20 and into the hollow portion 25, the seat cushion pad 18 would form an angular portion. As a result, this angular portion would spoil the seating comfort of the seat cushion 11. However, when there is no seat cushion pad 18 in the hollow portion 25 as in this embodiment, no angular portion is formed by the seat cushion pad 18; therefore, there is no loss of seating comfort.

As above-mentioned, by making the depth of the storage recessed portion 20 shallower towards the rear, the seat cushion pad 18 can be made thicker at a hip-point when a passenger sits on the seat cushion 11. This can prevent loss of seating comfort when sitting, which is caused by provision of the storage recessed portion 20.

The lid 30 is of a shape and size that can completely close the storage recessed portion 20 by fitting into its opening, and is approximately rectangular in plan view. The lid 30 includes a rear flat part 31, a front flat part 32 that connects via a step to a front of the rear flat part 31, and a retaining portion 33 that connects via a step to a front of the front flat part 32. Moreover, a plurality of (for example three) claws 34 are arranged dispersedly in the left-right direction at a rear end of the rear flat part 31, and extend toward the rear. The front flat part 32 protrudes slightly further upward than the rear flat part 31 and the retaining portion 33.

The lid 30 is movably attached to the under-cover part 19 by clipping the claws 34 into lid-attachment holes 23 provided in the under-cover part 19. As shown in FIG. 3, when the storage recessed portion 20 is closed with the lid 30, the retaining portion 33 is accommodated on the lower side of a retaining step 21 of the storage recessed portion 20, and the lid 30 becomes approximately coplanar with the under-cover part 19.

The rear side of the storage recessed portion 20, which forms the rotational center of the lid 30, is further to the rear than a top of the vertical shaft 15a, which forms the rotational center of the stand leg portion 15. The rotational radius of the lid 30 (i.e. the size of the lid 30 in its front-rear direction) and the rotational radius of the stand leg portion 15 (i.e. the length of the vertical shaft 15a) are set such that there is no mutual interference between the rotation of the lid 30 and the rotation of the stand leg portion 15.

As shown in FIG. 4, the under-cover part 19 includes recessed sitting portions 24 which correspond to the left and right sides of the front flat part 32 of the lid 30 in the closed condition, and are approximately coplanar with the front flat part 32. Control members 40 are attached to these sitting portions 24.

Figure 6A:
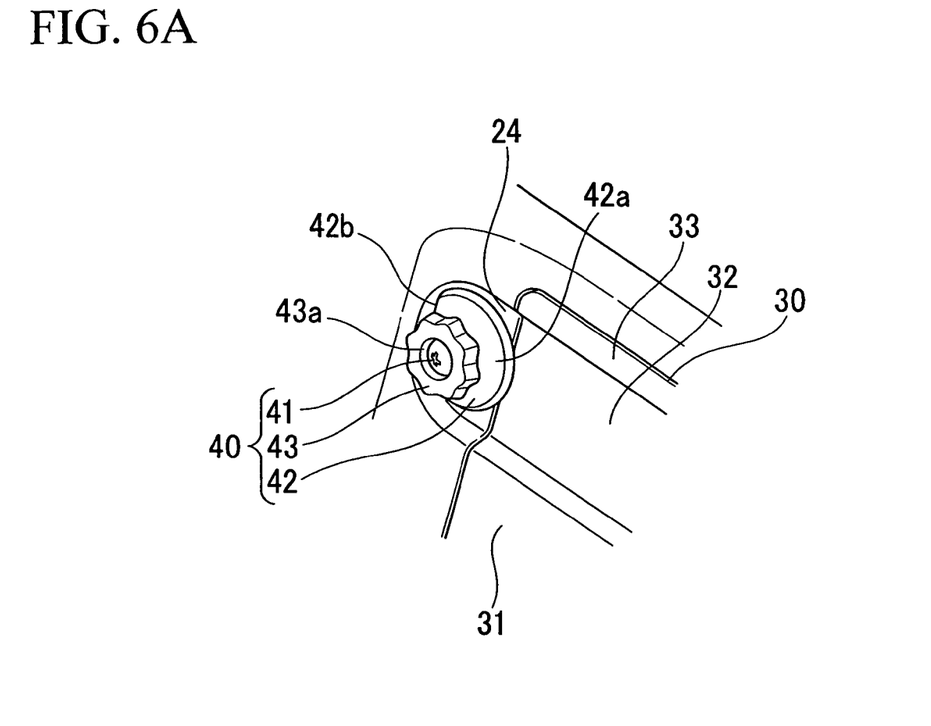
FIG. 6A is an explanatory view of an opening and closing operation of a control member.
Figure 6B:
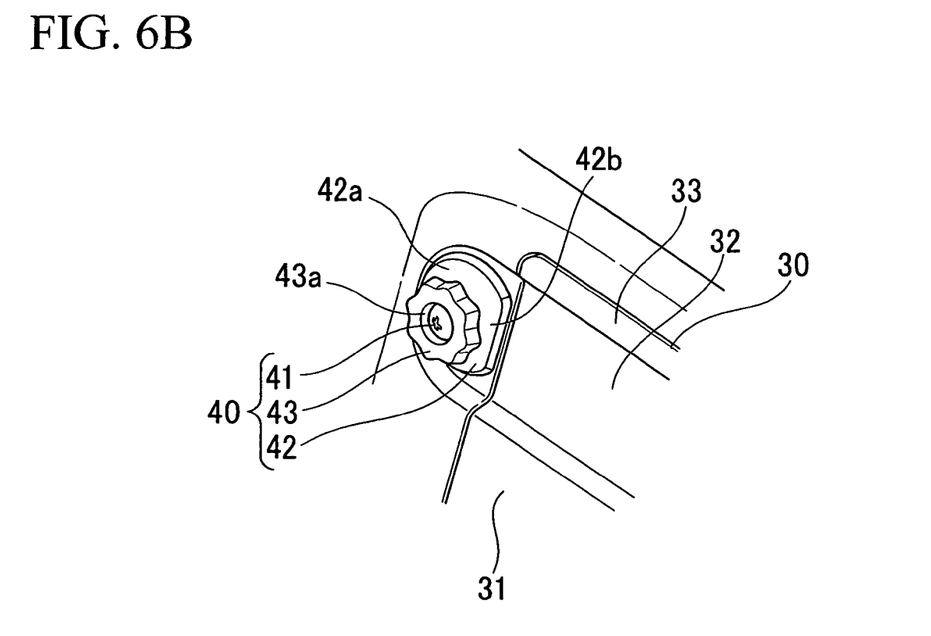
FIG. 6B is an explanatory view of another example of an opening and closing operation of a control member.

As shown in FIGS. 6A and 6B, each control member 40 includes a screw 41 that screws into a screw-hole (not shown) in the sitting portion 24, an opening and closing plate 42 that faces the sitting portion 24, and a grip 43. The screw 41, the opening and closing plate 42, and the grip 43 are connected together in a single rotatable body. A head portion of the screw 41 is accommodated in a recessed portion 43a in the center of the grip 43, and does not protrude outwardly from the grip 43.

The opening and closing plate 42 is formed in the shape of a circular disc with a partially notched outer peripheral portion. As shown in FIG. 6A, when the screw 41 is fully screwed into the sitting portion 24, a circular form portion 42a of the opening and closing plate 42 is superimposed below the front flat part 32 of the lid 30. Moreover, a notched portion 42b is on an opposite side to the front flat part 32. This holds the lid 30 in the closed condition. Therefore, the control members 40 function as holding members that hold the lid 30 in the closed condition.

The size of the grip 43 is set such that it protrudes downwardly from the entire top face of the under-cover part 19 when the screw 41 is fully screwed into the sitting portion 24.

From the condition of FIG. 6A, the grip 43 is rotated to loosen the screw 41, such that, as shown in FIG. 6B, the notched portion 42b of the opening and closing plate 42 is opposite the front flat part 32 of the lid 30. This enables the lid 30 to be opened with the notched portion 42b accommodated in the sitting portion 24 and not protruding to the side of the lid 30. In other words, the shape and size of the opening and closing plate 42 are set such that this is possible.

As shown in FIG. 2, when the rear seat 1A is in the dive-down condition and the seat cushion 11 is pressed down to the lower floor 101, the grips 43 of the control members 40 are mounted on the lower floor 101. The control members 40 stably support the seat cushion 11 on the lower floor 101. In the dive-down condition, therefore, the mounting of the seat cushion 11 with respect to the lower floor 101 is enhanced.

Making the grips 43 contact the lower floor 101 ensures that the control members 40 cannot be manipulated in the dive-down condition.

In the rear seat 1A of this configuration, when the storage recessed portion 20 is sealed with the lid 30, the storage recessed portion 20 and the lid 30 do not protrude from the bottom face of the seat cushion 11. Therefore, when the storage recessed portion 20 is sealed with the lid 30, good appearance is ensured by non-exposure of the storage recessed portion 20, not only when the rear seat 1A is in the condition of possible for sitting but also in the tip-up condition. Furthermore, since the storage recessed portion 20 and the lid 30 do not jut out from the bottom face of the seat cushion 10 in the tip-up condition, the space of the upper of the lower floor 101 is widely kept.

By the way, the condition of possible for sitting is not suitable for putting objects in and out for the storage recessed portion 20, since the opening of the storage recessed portion 20 faces downwards when the rear seat 1A is in the condition of possible for sitting.

Accordingly, as shown in FIG. 4, when putting the objects in and out for the storage recessed portion 20, the seat cushion 11 is shifted to the tip-up condition. Each control member 40 is then rotated to make the notched portion 42b of the opening and closing plate 42 face the front flat part 32 of the lid 30, allowing the lid 30 to be opened. A finger is inserted from the small recessed portion 22 of the under-cover part 19 and pressed against the retaining portion 33 of the lid 30, and the lid 30 is forwardly rotated around the rear end of the rear flat part 31. As shown in FIG. 5, the storage recessed portion 20 can be opened by opening the lid 30. Objects can also be accommodated in the storage recessed portion 20, or removed from it. When necessary, the claws 34 of the lid 30 can be released from the lid-attachment holes 23 of the under-cover part 19, enabling the lid 30 to be removed from the under-cover part 19.

After accommodating objects in the storage recessed portion 20 or removing them from it, the storage recessed portion 20 is sealed with the lid 30, the control members 40 are tightened, thereby holding the lid 30 in a closed condition.

Since the stand leg portion 15 is arranged such that it spans across the storage recessed portion 20 and the lid 30, there is no interference between the lid 30 and the stand leg portion 15 during opening and closing. The lid 30 can also be opened and closed while the stand leg portion 15 is upright with respect to the under-cover part 19.

As described above, when opening and closing the lid 30, the stand leg portion 15 is retracted by rotating it and folding it below the stand leg portion 15, thereby facilitating opening and closing. FIGS. 4 and 5 illustrate retraction of the stand leg portion 15. When the stand leg portion 15 is rotated and folded in the tip-up condition, the size of the protrusion from the bottom face of the seat cushion 11 can be reduced. As a result, above-mentioned, this enables the space above the lower floor 101 to be used more liberally.

The rear seat 1A of this configuration differs from a conventional one where, for example, a storage receptacle is provided on the outer side of the seat cushion 11, in that the storage recessed portion 20 is provided inside the seat cushion 11. Irrespective of whether the storage recessed portion 20 is included, this configuration can suppress the height of the seat cushion 11 from the lower floor 101 in the condition of possible for sitting.

Other Embodiments

The invention is not limited to the embodiment described above.

For example, while in the embodiment described above, the storage recessed portion 20 and the lid 30 are included in the rear seat 1A, they can be included in the rear seat 1B, or in both rear seats 1A and 1B.

Further, the lid 30 can be movably attached to the under-cover part 19 via a hinge, as for the composition not to be able to remove the lid 30 from the under-cover part 19, it is acceptable.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat for a vehicle having a vehicle body and a floor thereof, the seat comprising:
    a seatback;
    a seat cushion pivotally attached to the seatback along a first axis disposed adjacent to a rear portion of the seat cushion, the seat cushion comprising:
        a storage recessed portion which is provided in a bottom face of the seat cushion; and
        a lid which opens and closes the storage recessed portion, the lid being attached with a rear end portion of the storage recessed portion along a second axis;
    a hinge connecting the seatback to the vehicle body along a third axis; and
    at least one combined seat support and lid control member operatively attached to and extending outwardly from the bottom face of the seat cushion, the combined seat support and lid control member having a rotational axis which is substantially perpendicular to the bottom face of the seat cushion;
    wherein the seat is selectively adjustable between a seating configuration in which the seat cushion is disposed in a substantially horizontal orientation, an upright configuration in which the seat cushion is rotated about the first axis such that it is substantially parallel to the seatback, and a dive-down configuration such that the seatback and the seat cushion are both disposed in a substantially horizontal orientation by rotating the seatback along the third axis in a rear-to-front movement;
    wherein the storage recessed portion is accessible by opening the lid in a rear-to-front direction about the second axis when the seat is in the upright configuration;
    and wherein the combined seat support and lid control member is configured and arranged to support the seat cushion against the vehicle body floor when the seat is in the dive-down configuration.

2. The seat for a vehicle according to claim 1, wherein the depth of the storage recessed portion becomes shallower toward the rear of the seat cushion.

3. The seat for a vehicle according to claim 1, wherein the storage recessed portion includes a plurality of integrally formed walls disposed within a hollow portion of the seat cushion.

4. The seat for a vehicle according to claim 1, further comprising a seat frame operatively dividing the seat cushion into an upper seat pad portion and a lower hollow portion disposed between the seat frame and the bottom face.

5. The seat for a vehicle according to claim 4, wherein the seat frame comprises a divider extending between the seat pad and the hollow portion.

6. The seat for a vehicle according to claim 1, wherein the at least one combined seat support and lid control member includes an opening and closing plate configured to selectively cover or uncover a portion of the lid as the combined seat support and lid control member is rotated.

7. The seat for a vehicle according to claim 1, wherein a maximum depth of the storage recessed portion is more than twice a thickness of the lid.

8. The seat for a vehicle according to claim 1, wherein the storage recessed portion has a retaining step formed therein at a front end of the storage recessed portion, to receive a front edge portion of the lid therein when the lid is closed.

9. The seat for a vehicle according to claim 1, further comprising a leg stand portion including:
    left and right vertical shafts, each rotatably connected at the bottom face of the seat cushion on opposing sides of the lid, by upper ends of the left and right vertical shafts; and
    a horizontal shaft connecting lower ends of the left and right vertical shafts such that the leg stand portion substantially forms a U shape,
    wherein the leg stand switches between a standing orientation to support the seat cushion against the floor of the vehicle body when the seat is in the seating configuration and a laying orientation with the horizontal and vertical shafts in abutment with the seat cushion when the seat is in the upright configuration; and
    wherein the length of the lid in the front-rear direction is shorter than the length of the left and right vertical shafts in the front-rear direction; and
    wherein the second axis is positioned further rear than an upper portion of the vertical shafts and further front than the horizontal shaft such that the lid may freely rotate about the second axis without being obstructed by the leg stand portion.

10. A seat for a vehicle having a vehicle body and a floor thereof, said seat comprising:
    a seatback,
    a seat cushion having a top face, a bottom face opposing the top face, and a rear end adjacent to a lower portion of the seatback, wherein the seat cushion is connected to the seatback along a first axis disposed adjacent to the rear end of the seat cushion, the seat cushion comprising:
        a storage recessed portion extending inwardly along the bottom face of the seat cushion; and
        a lid which is operable to selectively open and close the storage recessed portion, the lid being rotatably attached with a rear end portion of the storage recessed portion via a supporting hinge,
    a hinge connecting the seatback to the vehicle body along a second axis, and
    at least one combined seat support and lid control member operatively attached to and extending outwardly from the bottom face of the seat cushion, the combined seat support and lid control member having a rotational axis which is substantially perpendicular to the bottom face of the seat cushion, wherein the seat is selectively adjustable between a seating configuration in which the seat cushion is disposed in a substantially horizontal orientation, an upright configuration in which the seat cushion is rotated about the first axis such that it is substantially parallel to the seatback, and a dive-down configuration such that both the seatback and the seat cushion are disposed in a substantially horizontal orientation by rotating the seatback along the second axis in a rear-to-front movement, wherein the storage recessed portion is accessible through the lid when the seat is in the upright configuration, and wherein the combined seat support and lid control member is configured and arranged to support the seat cushion against the vehicle body floor when the seat is in the dive-down configuration.

11. The seat for a vehicle according to claim 10, wherein the depth of the storage recessed portion becomes shallower toward the rear of the seat cushion.

12. The seat for a vehicle according to claim 10, further comprising a substantially U-shaped leg stand portion including:

left and right vertical shafts, each rotatably connected at the bottom face of the seat cushion on opposing sides of the lid, by upper ends of the left and right vertical shafts; and a horizontal shaft connecting lower ends of the left and right vertical shafts, wherein the leg stand switches between a standing orientation to support the seat cushion against the floor of the vehicle body when the seat is in the seating configuration and a laying orientation with the horizontal and vertical shafts in abutment with the seat cushion when the seat is in the upright configuration; and wherein the length of the lid in the front-rear direction is shorter than the length of the left and right vertical shafts in the front-rear direction; and, wherein a rotation axis of the lid is positioned further rear than an upper portion of the vertical shafts and further front than the horizontal shaft such that the lid may freely rotate about the second axis without being obstructed by the leg stand portion.

13. The seat for a vehicle according to claim 10, wherein the at least one combined seat support and lid control member includes an opening and closing plate configured to selectively cover or uncover a portion of the lid as the combined seat support and lid control member is rotated.

14. The seat for a vehicle according to claim 10, wherein a maximum depth of the storage recessed portion is more than twice a thickness of the lid.

15. The seat for a vehicle according to claim 10, wherein the storage recessed portion has a retaining step formed therein at a front end of the storage recessed portion, to receive a front edge portion of the lid therein when the lid is closed.

16. The seat for a vehicle according to claim 10, further comprising a seat frame operatively dividing the seat cushion into an upper seat pad portion and a lower hollow portion disposed between the seat frame and the bottom face.

17. The seat for a vehicle according to claim 16, wherein the seat frame comprises a divider extending between the seat pad and the hollow portion.

* * * * *